United States Patent
Yokota et al.

(10) Patent No.: US 10,491,661 B2
(45) Date of Patent: Nov. 26, 2019

(54) INFORMATION PROCESSING DEVICE, INFORMATION PROCESSING METHOD, AND INFORMATION PROCESSING SYSTEM

(71) Applicant: FUJITSU LIMITED, Kawasaki-shi, Kanagawa (JP)

(72) Inventors: Koichi Yokota, Yokohama (JP); Tatsuro Matsumoto, Yokohama (JP); Takashi Ohno, Kobe (JP); Naoki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 15/793,561

(22) Filed: Oct. 25, 2017

(65) Prior Publication Data

US 2018/0131750 A1 May 10, 2018

(30) Foreign Application Priority Data

Nov. 10, 2016 (JP) .................. 2016-220004

(51) Int. Cl.
G06F 15/173 (2006.01)
H04L 29/08 (2006.01)

(52) U.S. Cl.
CPC .............. *H04L 67/06* (2013.01); *H04L 67/10* (2013.01); *H04L 67/18* (2013.01); *H04L 67/327* (2013.01)

(58) Field of Classification Search
USPC ....... 709/203, 206, 217, 219, 223, 224, 225, 709/226, 228, 230, 232, 238; 711/171; 345/157
See application file for complete search history.

(56) References Cited

U.S. PATENT DOCUMENTS

| | | | | |
|---|---|---|---|---|
| 2001/0004254 | A1* | 6/2001 | Okahara | G06F 3/038 345/157 |
| 2005/0289265 | A1* | 12/2005 | Illowsky | G06F 1/3203 709/230 |
| 2016/0132247 | A1* | 5/2016 | Lu | G06F 3/0604 711/171 |
| 2018/0131750 | A1* | 5/2018 | Yokota | H04L 67/06 |

FOREIGN PATENT DOCUMENTS

JP 2013-254301 12/2013

\* cited by examiner

*Primary Examiner* — Quang N Nguyen

(74) *Attorney, Agent, or Firm* — Staas & Halsey LLP

(57) ABSTRACT

An information processing device includes a memory and a processor coupled to the memory. The processor is configured to receive terminal information of each of a plurality of terminals. The terminal information includes position information indicating a position of a relevant terminal of the plurality of terminals and file information indicating files accessible from the relevant terminal. The processor is configured to compare the file information of the plurality of terminals on the basis of the terminal information. The processor is configured to determine, on the basis of a result of the comparison, a target file to be shared. The target file is a file satisfying a predetermined requirement. The processor is configured to execute a sharing process of causing the plurality of terminals to share the target file.

3 Claims, 9 Drawing Sheets

FIG. 2

| ID | TERMINAL ID | USER ID | POSITIONAL INFORMATION | HELD FILE |
|---|---|---|---|---|
| 0 | 02ER7E03 | Taro | aaaa | 201609meeting.xlsx, Foo.jps |
| 1 | Y5GU88P1 | Hanako | aaaa | 201609meeting.xlsx, 0804presentation.pptx |
| 2 | T2G3EPP2 | Ichiro | bbb | demonstration.mov |
| 3 | 36GUEGYP | Jack | ccc | 0907minute.docx |
| 4 | 02ER7E03 | Taro | ccc | 0908document.pptx |
| … | … | … | … | … |

FIG. 3

POSITIONAL INFORMATION : aaaa

| TO-BE-SHARED FILE | OWNER TERMINAL ID | NON-OWNER TERMINAL ID | SHARING PERMISSION INQUIRY FLAG |
|---|---|---|---|
| 201609meeting.xlsx | 02ER7E03, Y5GU88P1 | | OFF |
| 0804presentation.pptx | Y5GU88P1 | 02ER7E03 | ON |

POSITIONAL INFORMATION : cccc

| TO-BE-SHARED FILE | OWNER TERMINAL ID | NON-OWNER TERMINAL ID | SHARING PERMISSION INQUIRY FLAG |
|---|---|---|---|
| 0907minute.docx | 36GUEGYP | 02ER7E03 | ON |
| 0908document.pptx | 02ER7E03 | 36GUEGYP | ON |

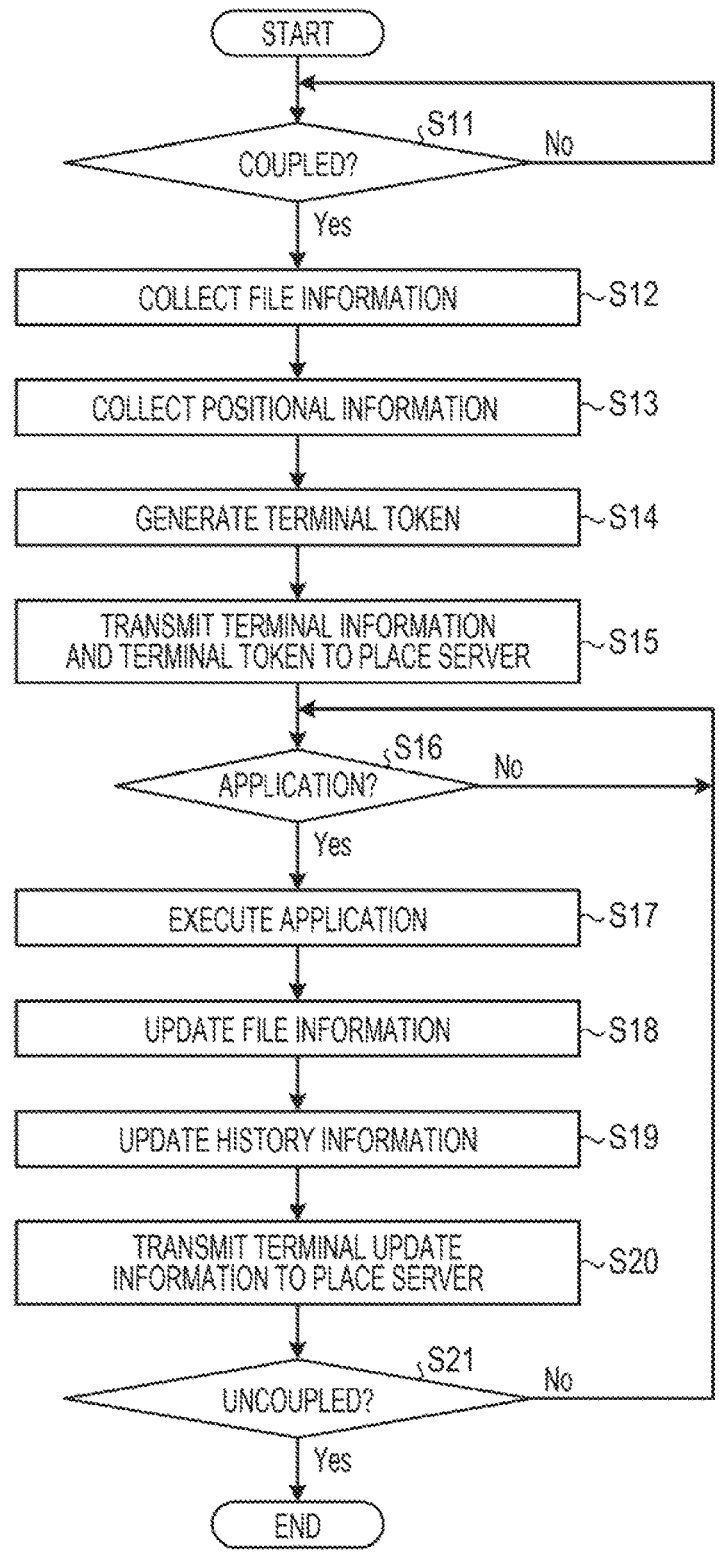

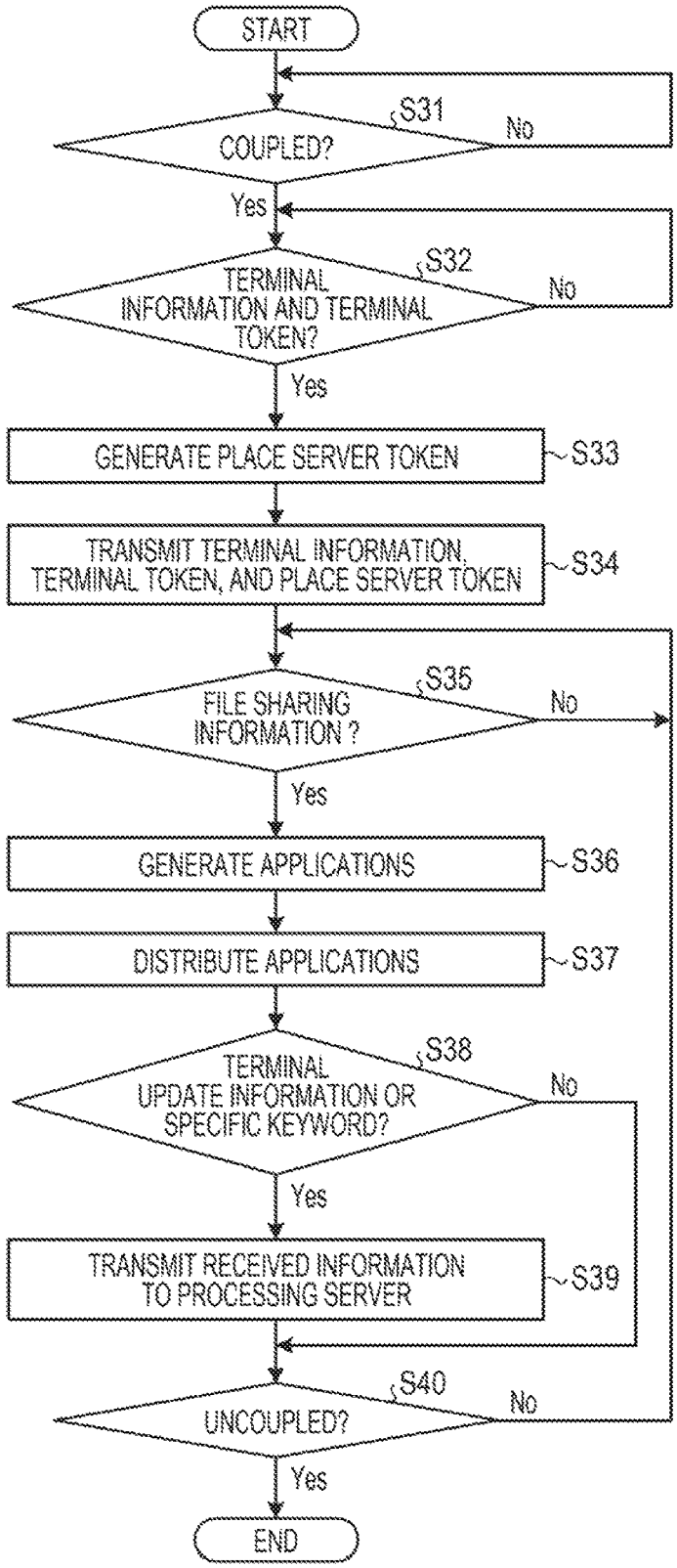

INFORMATION PROCESSING DEVICE, INFORMATION PROCESSING METHOD, AND INFORMATION PROCESSING SYSTEM

CROSS-REFERENCE TO RELATED APPLICATION

This application is based upon and claims the benefit of priority of the prior Japanese Patent Application No. 2016-220004, filed on Nov. 10, 2016, the entire contents of which are incorporated herein by reference.

FIELD

The embodiment discussed herein is related to an information processing device, an information processing method, and an information processing system.

BACKGROUND

A file included in a terminal may be shared among the terminal and other terminals. In this case, the file to be shared is manually set and a range to be made publicly available is manually set.

A technique for automatically setting a range, within which information is to be shared, is known. In this technique, an information processing device determines, based on information on positional relationships and a preset requirement, devices that may share information.

Related techniques are disclosed in, for example, Japanese Laid-open Patent Publication No. 2013-254301.

In a conventional technique, it takes time and efforts to share a file among terminals. In addition, in a case where a file is to be shared among terminals, there is a problem that it is difficult to share an appropriate file among terminals.

For example, in a conventional technique, in a case where a file is to be shared among terminals, the file to be shared is manually set, and it takes time and efforts to manually set the file. In addition, in a case where a file is to be shared among terminals, a range within which the file is made publicly available is manually set, and it takes time and efforts to manually set the range to be made publicly available.

In another example, in a case where a file is to be shared among terminals, even if the terminals hold sharable files, the terminals do not share the files until users of the terminals perform mutual confirmation of the sharing of the files. For example, it is assumed that a user A and a user B conduct a meeting and hold a file C1 related to the meeting in terminals of the users A and B. However, the file C1 is not shared until the users A and B orally confirm the sharing of the file C1. As a result, the users A and B may lose an opportunity for detailed discussion at the meeting. Even in a case where the technique for automatically setting a range within which information is to be shared is applied, the information is shared only when an information processing device exists in a certain range only for a certain time period. It is, therefore, difficult to share the file C1 during a whole time period of the meeting. As a result, the users A and B may lose an opportunity for detailed discussion at the meeting.

SUMMARY

According to an aspect of the present invention, provided is an information processing device including a memory and a processor coupled to the memory. The processor is configured to receive terminal information of each of a plurality of terminals. The terminal information includes position information indicating a position of a relevant terminal of the plurality of terminals and file information indicating files accessible from the relevant terminal. The processor is configured to compare the file information of the plurality of terminals on the basis of the terminal information. The processor is configured to determine, on the basis of a result of the comparison, a target file to be shared. The target file is a file satisfying a predetermined requirement. The processor is configured to execute a sharing process of causing the plurality of terminals to share the target file.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data structure of a data table according to the embodiment;

FIG. 3 is a diagram illustrating an example of file sharing information according to the embodiment;

FIG. 5 is a flowchart illustrating an exemplary process executed by a terminal according to the embodiment;

FIG. 6 is a flowchart illustrating an exemplary process executed by a place server according to the embodiment;

DESCRIPTION OF EMBODIMENT

Hereinafter, an embodiment is described in detail with reference to the accompanying drawings. The present disclosure is not limited to the embodiment.

Embodiment

Figure 1:
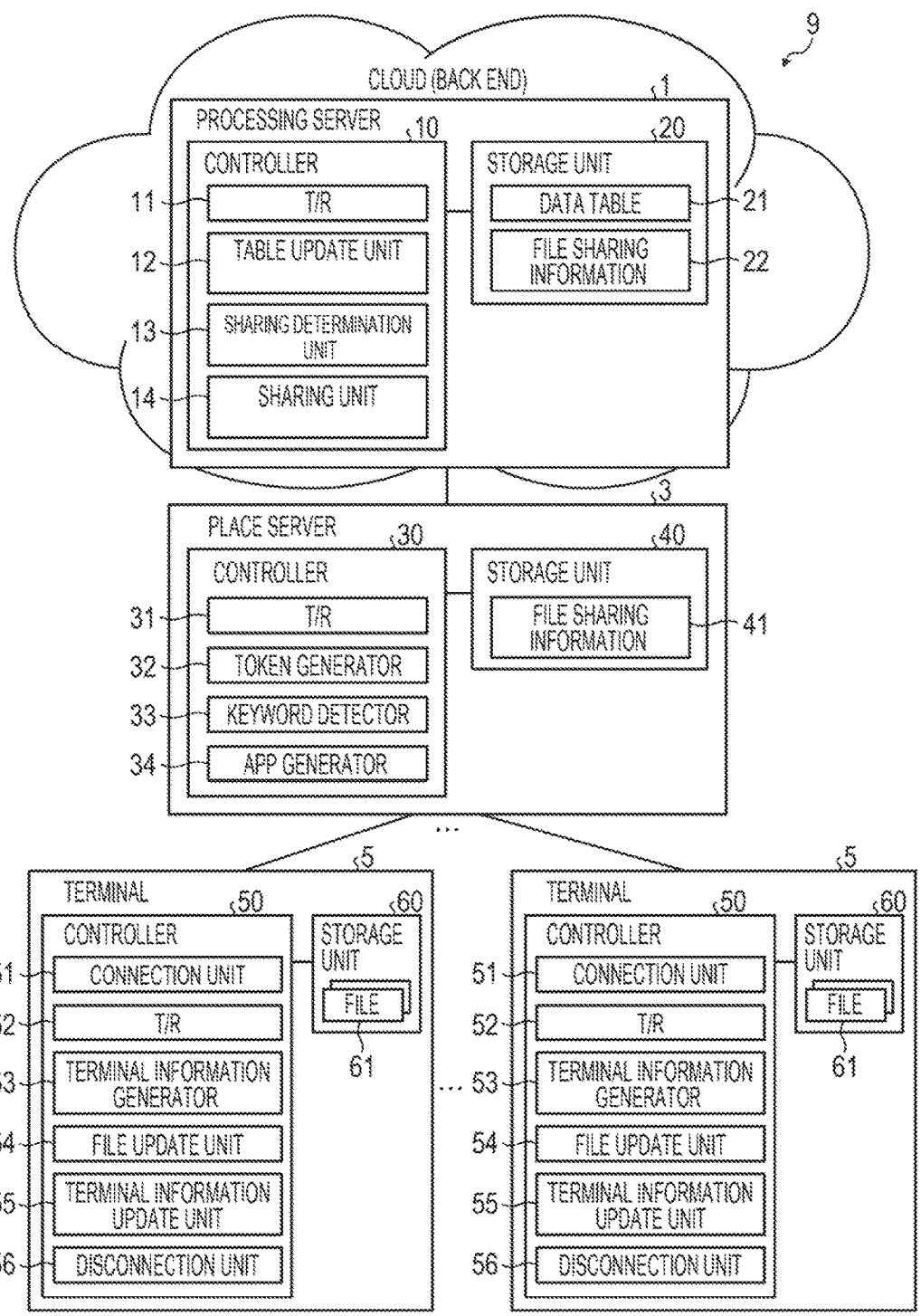
FIG. 1 is a diagram illustrating a functional configuration of an information processing system according to an embodiment.

FIG. 1 is a diagram illustrating a functional configuration of an information processing system according to an embodiment. An information processing system 9 includes a processing server 1, a place server 3, and a plurality of terminals 5. The information processing system 9 compares information of files held in terminals 5 existing in the same place, determines a file satisfying a predetermined requirement as a target file to be shared, and executes a sharing process on the terminals 5. For example, the information processing system 9 is used to cause terminals 5 existing in a meeting place to share a target file to be shared. The case where the information processing system 9 is used for the meeting place is an example, and the information processing system 9 is not limited to this case.

The processing server 1 identifies a target file to be shared and executes the process of sharing the file among terminals. The processing server 1 provides a service in cloud computing. The processing server 1 is a cloud computing server, but is not limited to this. The processing server 1 may be a server coupled to the place server 3 via a local area network (LAN), a wide area network (WAN), or the like.

The processing server 1 includes a controller 10 and a storage unit 20.

The controller 10 includes an internal memory configured to store therein control data and a program defining various processes, and executes the various processes using the program and the control data. For example, the controller 10 corresponds to an electronic circuit of an integrated circuit such as an application specific integrated circuit (ASIC) or a field programmable gate array (FPGA). Alternatively, the controller 10 corresponds to an electronic circuit such as a central processing unit (CPU) or a micro processing unit (MPU).

The storage unit 20 corresponds to a storage device such as a nonvolatile semiconductor memory element such as a flash memory or a ferroelectric random access memory (FRAM) (registered trademark). The storage unit 20 stores therein a data table 21 and file sharing information 22. The data table 21 includes, for each of the terminals 5, positional information indicating the position of the terminal 5 and information indicating a file held in the terminal 5. The file sharing information 22 includes, for each of target files to be shared, information indicating a terminal 5 holding the target file to be shared and information indicating a terminal 5 that does not hold the target file to be shared. An example of data structures of the data table 21 and the file sharing information 22 is described later.

The place server 3 coordinates a place-based service for exchanging data among terminals existing in a local place and executes the place-based service on terminals 5 existing in each of local places. The embodiment assumes that the data to be exchanged is a file. The place server 3 may be an edge server in edge computing.

The place server 3 includes a controller 30 and a storage unit 40.

The controller 30 includes an internal memory configured to store therein control data and a program defining various processes, and executes the various processes using the program and the control data. For example, the controller 30 corresponds to an electronic circuit of an integrated circuit such as an ASIC or an FPGA. Alternatively, the controller 30 corresponds to an electronic circuit such as a CPU or an MPU.

The storage unit 40 corresponds to a storage device such as a nonvolatile semiconductor memory element such as a flash memory or an FRAM (registered trademark). The storage unit 40 stores therein file sharing information 41. The file sharing information 41 includes, for each of target files to be shared, information indicating a terminal 5 holding the target file to be shared and information indicating a terminal 5 that does not hold the target file to be shared. The file sharing information 41 is the file sharing information 22 transmitted from the processing server 1 and stored in the storage unit 40.

Each of the terminals 5 includes a display function and a radio communication function, and corresponds to, for example, a mobile terminal device such as a smartphone, a mobile phone, a personal handy-phone system (PHS), a personal digital assistant (PDA), or a pager. Each of the terminals 5 may also include a global positioning system (GPS) function to be used to measure the position of the terminal 5 and may be coupled to the place server 3 over radio communication. The radio communication may be any near-field radio communication, for example, Wireless Fidelity (WiFi) (registered trademark) or radio communication conforming to the Bluetooth (registered trademark) standard, or the like. Each of the terminals 5 includes a controller 50 and a storage unit 60.

The controller 50 includes an internal memory configured to store therein control data and a program defining various processes, and executes the various processes using the program and the control data. For example, the controller 50 corresponds to an electronic circuit of an integrated circuit such as an ASIC or an FPGA. Alternatively, the controller 50 corresponds to an electronic circuit such as a CPU or an MPU.

The storage unit 60 corresponds to a storage device such as a nonvolatile semiconductor memory element such as a flash memory or an FRAM (registered trademark). The storage unit 60 stores therein a file 61. The file 61 is held in a terminal 5 and shared with another terminal 5. The storage unit 60 may store therein a single file 61 or multiple files 61.

The controller 50 of each terminal 5 includes a connection unit 51, a transmitter/receiver (T/R) 52, a terminal information generator 53, a file update unit 54, a terminal information update unit 55, and a disconnection unit 56.

The connection unit 51 establishes a path of radio communication to the place server 3.

The transmitter/receiver 52 transmits and receives information to and from the place server 3. For example, the transmitter/receiver 52 transmits, to the place server 3, information including terminal information which is information on the terminal 5. Upon receiving an application (described later) from the place server 3, the transmitter/receiver 52 transmits or receives a file specified in the received application.

The terminal information generator 53 generates the information (terminal information) on the terminal 5. For example, the terminal information generator 53 collects information (file information) of a file held in its own terminal 5. An example of the file information is the name of the file. The terminal information generator 53 collects positional information indicating the position of its own terminal 5. In addition, the terminal information generator 53 acquires a terminal identifier (ID) of its own terminal 5 and a user ID. The terminal ID is an identifier uniquely identifying the terminal 5 and is, for example, an international mobile equipment identifier (IMEI), a media access control (MAC) address, or the like. The user ID is an identifier uniquely identifying a user who uses the terminal 5. The terminal information generator 53 generates terminal information including the collected file information, the collected positional information, the acquired terminal ID, and the acquired user ID. In addition, the terminal information generator 53 generates a terminal token from information included in the generated terminal information. The terminal token is authentication information generated to authenticate its own terminal 5. The processing server 1 and the place server 3 use the terminal token to authenticate the terminal 5.

The file update unit 54 updates, based on the application, a target file to be shared with another terminal 5. For example, the file update unit 54 executes the application received by the transmitter/receiver 52. Then, if the application causes the terminal 5 to acquire and share the target file to be shared, the file update unit 54 acquires the file from another terminal 5 and shares the file when the terminal 5 exists in a place specified in the application. If the application causes the terminal 5 to share the target file to be shared, the file update unit 54 shares the file held in the terminal 5 with the other terminal 5 when the terminal 5 exists in the place specified in the application. Then, the file update unit 54 updates history information of the application. As an example, the sharing causes an icon of the target file to be shared among the terminals 5 to be displayed on a monitor of its own terminal 5 or causes the target file to be shared among the terminals 5 to be displayed on the monitor of its own terminal 5. Specifically, the sharing causes users of the terminals 5 to recognize the target file to be shared among the terminals 5. If the sharing causes the icon of the target file to be shared to be displayed on the monitor of the terminal 5, the icon of the shared file may be highlighted and displayed on the monitor of the terminal 5.

The terminal information update unit 55 updates the terminal information. For example, when a file is added to and held in its own terminal 5, the terminal information update unit 55 updates the file information included in the terminal information to include information of the added file. When a file held in its own terminal 5 is deleted, the terminal information update unit 55 updates the file information included in the terminal information to remove information of the deleted file. The updated terminal information (hereinafter referred to as terminal update information) is transmitted by the transmitter/receiver 52.

The disconnection unit 56 cuts the path of radio communication between its own terminal 5 and the place server 3. For example, upon receiving a disconnection request from the place server 3, the disconnection unit 56 cuts the path of radio communication between its own terminal 5 and the place server 3.

The controller 30 of the place server 3 includes a transmitter/receiver 31, a token generator 32, a keyword detector 33, and an application (denoted by "app" in the drawings) generator 34.

The transmitter/receiver 31 transmits and receives information to and from the processing server 1. The transmitter/receiver 31 transmits and receives information to and from a terminal 5 existing in a communication range of the place server 3. For example, the transmitter/receiver 31 receives information including terminal information or terminal update information from a terminal 5 existing in the communication range. In addition, the transmitter/receiver 31 receives file sharing information 22 from the processing server 1. Furthermore, the transmitter/receiver 31 transmits information including terminal information or terminal update information of each of the terminals 5 to the processing server 1. The transmitter/receiver 31 distributes, to terminals 5 with which the place server 3 is communicating, an application generated for each of the terminals 5 from file sharing information 22.

The token generator 32 generates a token (place server token) of the place server 3. For example, the token generator 32 generates the token of the place server 3 from a server ID of the place server 3, access point information, and information indicating the start time of the generation of the token, in addition to a terminal ID, a user ID, and positional information included in terminal information received from a terminal 5. The server ID is an identifier uniquely identifying the place server 3 and is, for example, an IMEI, a MAC address, or the like. Examples of the access point information includes a basic service set identifier (BSSID), a service set identifier (SSID), and the like. The place server token is authentication information generated to authenticate the place server 3. The processing server 1 and the terminals 5 use the place server token to authenticate the place server 3.

The keyword detector 33 monitors information in a place and detects a specific keyword. For example, the keyword detector 33 monitors words received from users using terminals 5 existing in the place and detects the specific keyword. Examples of the specific keyword include a word frequently received from the users, a Uniform Resource Locator (URL) frequently referenced by the users, and the like.

The application generator 34 generates an application for each of the terminals 5 existing in the place. For example, the application generator 34 references the file sharing information 41 received by the transmitter/receiver 31, and if a terminal 5 that does not hold a target file to be shared exists, the application generator 34 generates, for the terminal 5, an application including information of the target file to be shared and positional information. Specifically, the application generator 34 generates the application in order to cause the terminal 5 to acquire and share the target file. In addition, the application generator 34 generates, for each of all the terminals 5 holding the target file to be shared, an application including the information of the target file to be shared and the positional information. Specifically, the application generator 34 generates the application in order to cause the terminal 5 to share the target file to be shared. If a flag (sharing permission inquiry flag which is described later) indicating whether to notify of an inquiry regarding whether or not sharing is permitted is set in the file sharing information 41, the application generator 34 may embed, in a corresponding application, the inquiry regarding whether or not sharing is permitted.

The controller 10 of the processing server 1 includes a transmitter/receiver 11, a table update unit 12, a sharing determination unit 13, and a sharing unit 14.

The transmitter/receiver 11 transmits and receives information to and from the place server 3. For example, the transmitter/receiver 11 receives, from the place server 3, information including the terminal information or terminal update information of the terminals 5. The transmitter/receiver 11 receives a specific keyword detected in a certain place. The transmitter/receiver 11 transmits the file sharing information 22 to the place server 3.

The table update unit 12 uses the terminal information or terminal update information of the terminals 5 to update the data table 21.

An example of a data structure of the data table 21 is described with reference to FIG. 2. FIG. 2 is a diagram illustrating the example of the data structure of the data table 21 according to the embodiment. As illustrated in FIG. 2, each row of the data table 21 includes a terminal ID 21b, a user ID 21c, positional information 21d, and a held file 21e in association with an ID 21a. The ID 21a is an identifier uniquely identifying each row of the data table 21. The terminal ID 21b is a terminal ID of a terminal 5 and uniquely identifies the terminal 5. Specifically, the terminal ID 21b corresponds to a terminal ID included in the terminal information and the terminal update information. The user ID 21c is an identifier uniquely identifying a user who uses the terminal 5. Specifically, the user ID 21c corresponds to a user ID included in the terminal information and the terminal update information. The positional information 21d is information of the position of the terminal 5. Specifically, the positional information 21d corresponds to positional information included in the terminal information and the terminal update information. The held file 21e is information of files held in the terminal 5. Specifically, the held file 21e corresponds to file information included in the terminal information and the terminal update information. The file information is the name of the file as an example.

As an example, in a row in which the terminal ID 21b indicates "02ER7E03", the user ID 21c indicates "Taro", the positional information 21d indicates "aaaa", and the held file 21e indicates "201609meeting.xlsx, Foo.jpg". In a row in which the terminal ID 21b indicates "Y5GU88P1", the user ID 21c indicates "Hanako", the positional information 21d indicates "aaaa", and the held file 21e indicates "201609meeting.xlsx, 0804presentation.pptx".

Returning to FIG. 1, for example, the table update unit 12 references terminal information received by the transmitter/receiver 11 and adds, to the data table 21, a new row including the terminal ID 21b, the user ID 21c, the positional information 21d, and the held file 21e respectively indicating the terminal ID, the user ID, the positional information, and the file information that are included in the terminal information. The table update unit 12 references terminal update information received by the transmitter/receiver 11 and updates the held file 21e of a row including the terminal ID 21b, the user ID 21c, and the positional information 21d respectively indicating the terminal ID, the user ID, and the positional information that are included in the terminal update information, with the file information included in the terminal information. The table update unit 12 may update the positional information 21d and the held file 21e of a row including the terminal ID 21b and the user ID 21c respectively indicating the terminal ID and the user ID included in the terminal update information while including the positional information 21d indicating information different from the positional information included in the terminal update information, with the positional information and the file information that are included in the terminal update information. The table update unit 12 executes the update of the data table 21 for each piece of terminal information and each piece of terminal update information received by the transmitter/receiver 11.

The sharing determination unit 13 compares files held in multiple terminals 5 existing in the same place with each other and determines whether or not each of the files is to be shared. For example, the sharing determination unit 13 references the data table 21 and reads the terminal ID 21b and the held file 21e from rows including the same positional information 21d. If all of the terminals 5 identified by the read terminal ID 21b hold the same file, the sharing determination unit 13 determines that the file is a target file to be shared and causes the sharing unit 14 (described later) to execute a file sharing process on the file. In addition, if not all of the terminals 5 holding the same file but the ratio of the number of the terminal IDs 21b of the terminals 5 holding the same file to the number of all terminals IDs 21b read from the data table 21 is equal to or larger than a predetermined ratio, the sharing determination unit 13 determines that the file is a target file to be shared and causes the sharing unit 14 to execute the file sharing process on the file. The predetermined ratio is, for example, 50%, but may be 40% or 60% or may be changed. When a specific keyword detected in a certain place is received by the transmitter/receiver 11, the sharing determination unit 13 executes the following process. Specifically, if the specific keyword is included in a file indicated by the held file 21e associated with positional information 21d indicating the certain place, the sharing determination unit 13 determines that the file including the specific keyword is a target file to be shared and causes the sharing unit 14 to execute the file sharing process on the file.

The sharing unit 14 executes the file sharing process on a target file to be shared and generates the file sharing information 22.

An example of the file sharing information 22 is described with reference to FIG. 3. FIG. 3 is a diagram illustrating the example of the file sharing information 22 according to the embodiment. As illustrated in FIG. 3, each of the file sharing information 22 is generated for each piece of the positional information. Each row of the file sharing information 22 includes a to-be-shared file 22a, an owner terminal ID 22b, a non-owner terminal ID 22c, and a sharing permission inquiry flag 22d in association with each other. The to-be-shared file 22a is the name of a target file to be shared. The owner terminal ID 22b is a terminal ID of a terminal 5 holding the file indicated by the to-be-shared file 22a. The non-owner terminal ID 22c is a terminal ID of a terminal 5 that does not hold the file indicated by the to-be-shared file 22a. The sharing permission inquiry flag 22d indicates whether or not an inquiry regarding whether or not a terminal 5 holding a file indicated by the to-be-shared file 22a permits the sharing of the file is to be notified. As an example, if the sharing permission inquiry flag 22d indicates "ON", the inquiry is notified. If the sharing permission inquiry flag 22d indicates "OFF", the inquiry is not notified.

As an example, in a row of the file sharing information 22 for the positional information "aaaa", the to-be-shared file 22a indicates "201609meeting.xlsx", the owner terminal ID 22b indicates "02ER7E03" and "Y5GU88P1", the non-owner terminal ID 22c indicates a null value, and the sharing permission inquiry flag 22d indicates "OFF". In this case, the file of "201609meeting.xlsx" is held in both the terminal 5 of "02ER7E03" and the terminal 5 of "Y5GU88P1". In another row of the file sharing information 22 for the positional information "aaaa", the to-be-shared file 22a indicates "0804presentation.pptx", the owner terminal ID 22b indicates "Y5GU88P1", the non-owner terminal ID 22c indicates "02ER7E03", and the sharing permission inquiry flag 22d indicates "ON". In this case, the file of "0804presentation.pptx" is held in the terminal 5 of "Y5GU88P1", but is not held in the terminal 5 of "02ER7E03".

Returning to FIG. 1, for example, the sharing unit 14 references the data table 21 and sorts, with respect to the file identified by the to-be-shared file 22a, terminal ID 21b included in each row into a terminal ID 21b of a terminal 5 holding the file and a terminal ID 21b of a terminal 5 that does not hold the file. The sharing unit 14 sets the sorted terminal ID 21b of the terminal 5 holding the file in the owner terminal ID 22b of the file sharing information 22. The sharing unit 14 sets the sorted terminal ID 21b of the terminal 5 that does not hold the file in the non-owner terminal ID 22c of the file sharing information 22. In a case where there are both the terminal 5 holding the file and the terminal 5 which does not hold the file, the sharing unit 14 may set the sharing permission inquiry flag 22d of the file sharing information 22 to "ON". Specifically, the sharing unit 14 may set the sharing permission inquiry flag 22d of the file sharing information 22 to "ON" in order to notify, to the terminal 5 holding the file, an inquiry regarding whether or not the terminal 5 holding the file permits the sharing of the file.

Figure 4A:
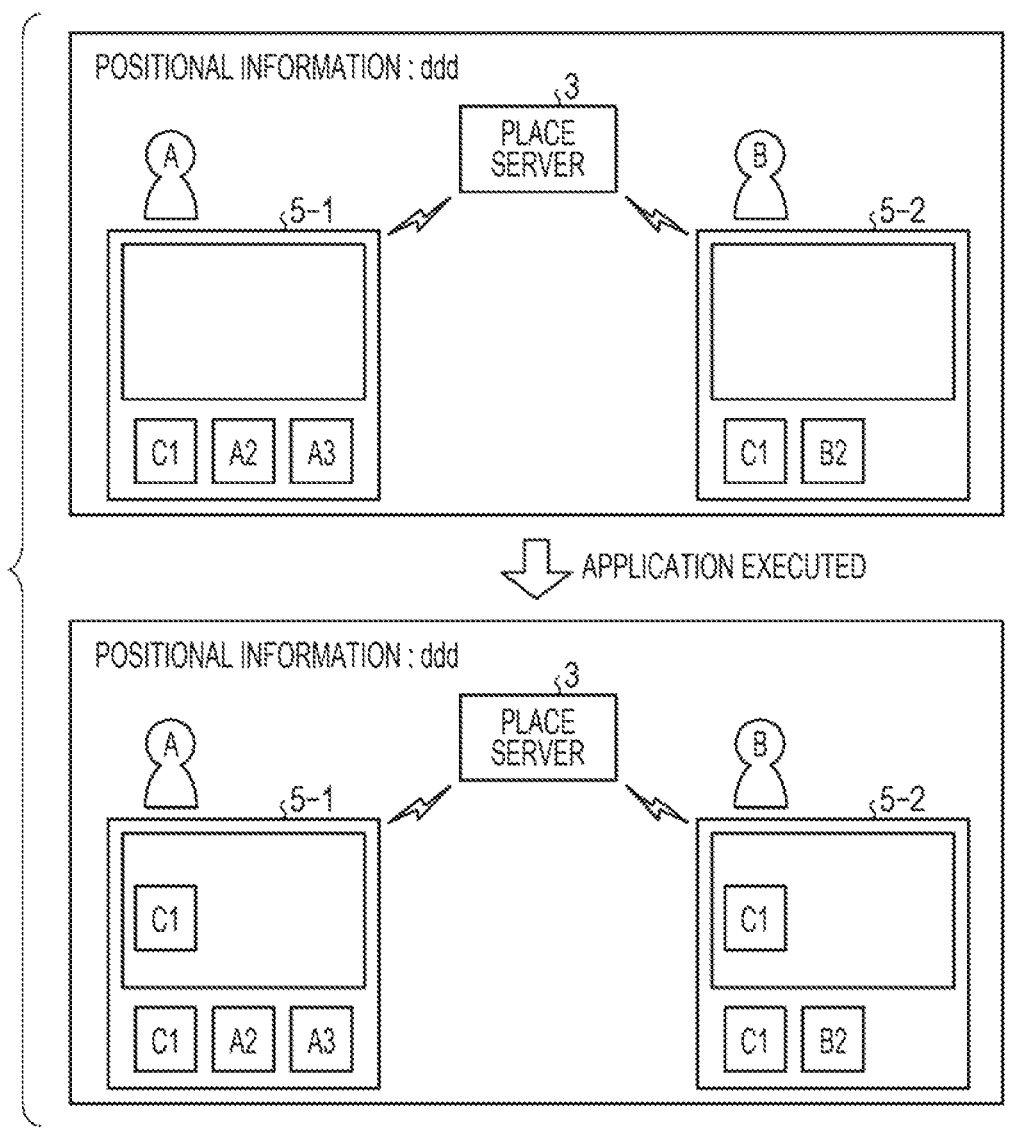
FIG. 4A is a diagram illustrating a specific example of file sharing according to the embodiment.
Figure 4B:
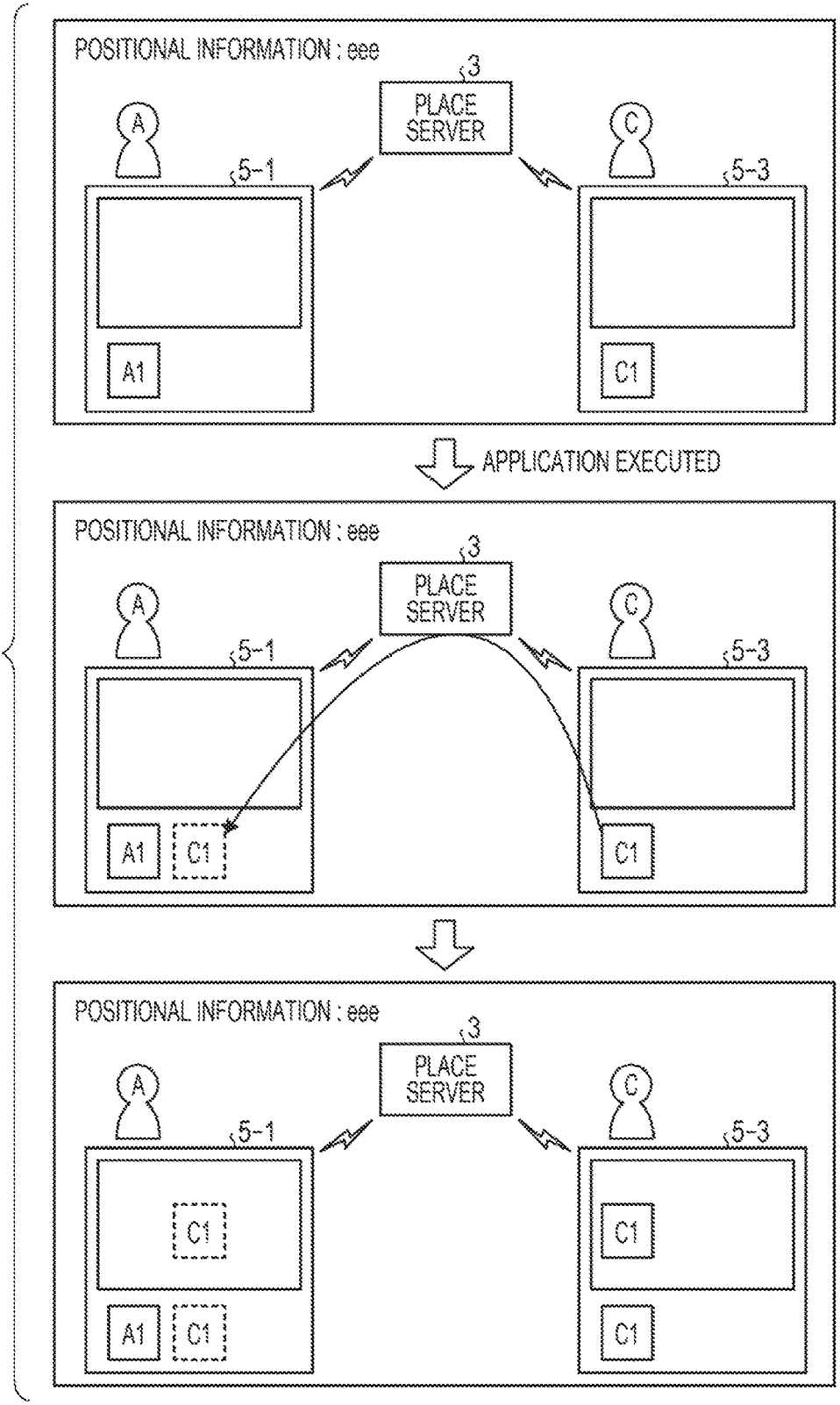
FIG. 4B is a diagram illustrating a specific example of file sharing according to the embodiment.

Specific examples of the file sharing according to the embodiment are described with reference to FIGS. 4A and 4B. FIGS. 4A and 4B are diagrams illustrating the specific examples of the file sharing according to the embodiment.

FIG. 4A illustrates a specific example of the file sharing in a case where all terminals 5 existing in the same place hold the same file. FIG. 4B illustrates a specific example of the file sharing in a case where 50% of terminals 5 existing in the same place hold the same file.

As illustrated in FIG. 4A, a terminal 5-1 of a user A and a terminal 5-2 of a user B exist in the same place indicated by positional information ddd. The example illustrated in FIG. 4A is described focusing on a file C1.

First, in the terminal 5-1, the terminal information generator 53 generates terminal information including information of the file C1 held in the terminal 5-1, the positional information ddd of the terminal 5-1, a terminal ID of the terminal 5-1, and a user ID of the user A, and transmits the generated terminal information to the place server 3 via the transmitter/receiver 52.

In the terminal 5-2, the terminal information generator 53 generates terminal information including the information of the C1 held in the terminal 5-2, the positional information ddd of the terminal 5-2, a terminal ID of the terminal 5-2, and a user ID of the user B, and transmits the generated terminal information to the place server 3 via the transmitter/receiver 52.

In the place server 3, the token generator 32 generates a place server token from the terminal IDs included in the terminal information, the user IDs included in the terminal information, the positional information ddd included in the terminal information, the server ID of the place server 3, access point information, and information indicating the start time of the generation of the token. Then, the transmitter/receiver 31 transmits information including the place server token, the terminal information of the terminal 5-1, and the terminal information of the terminal 5-2 to the processing server 1.

In the processing server 1, the table update unit 12 references the terminal information of the terminal 5-1, which is received from the place server 3, and adds, to the data table 21, the terminal ID, the user ID, the positional information ddd, and the file information C1 that are included in the terminal information of the terminal 5-1. In addition, the table update unit 12 references the terminal information of the terminal 5-2, which is received from the place server 3, and adds, to the data table 21, the terminal ID, the user ID, the positional information ddd, and the file information C1 that are included in the terminal information of the terminal 5-2.

In addition, in the processing server 1, the sharing determination unit 13 references the data table 21. If all terminals 5 identified by the terminal ID 21b and existing in the same place hold the same file, the sharing determination unit 13 determines that the file is a target file to be shared. In this example, since all the terminals 5-1 and 5-2 existing in the same place indicated by the positional information ddd hold the same file C1, the sharing determination unit 13 determines that the file C1 is a target file to be shared. Then, the sharing unit 14 sets the terminal IDs of the terminals 5-1 and 5-2 holding the file C1 to be shared in the owner terminal ID 22b of file sharing information 22 for the positional information ddd. No data is set in the non-owner terminal ID 22c. Then, the transmitter/receiver 11 transmits the file sharing information 22 to the place server 3.

In the place server 3, the application generator 34 references the file sharing information 41 (the file sharing information 22 received by the transmitter/receiver 31). If there is no terminal 5 that does not hold the target file to be shared, the application generator 34 executes the following process. Specifically, the application generator 34 generates, for the respective terminals 5 holding the target file to be shared, applications including information of the target file to be shared and the positional information. In the aforementioned example, since there is no terminal 5 that does not hold the file C1 to be shared, the application generator 34 generates, for the respective terminals 5-1 and 5-2, applications including the information of the file C1 to be shared and the positional information ddd. Specifically, the application generator 34 generates the applications in order to cause the terminals 5-1 and 5-2 to share the file C1 to be shared. Then, the transmitter/receiver 31 transmits the generated applications to the terminals 5-1 and 5-2.

Since the terminal 5-1 exists in the place indicated by the positional information ddd included in the application, the file update unit 54 of the terminal 5-1 shares the file C1 to be shared, which is held in the terminal 5-1, upon executing the application received by the transmitter/receiver 52. In this case, the file update unit 54 displays the file C1 on a monitor of the terminal 5-1.

Since the terminal 5-2 exists in the place indicated by the positional information ddd included in the application, the file update unit 54 of the terminal 5-2 shares the file C1 to be shared, which is held in the terminal 5-2, upon executing the application received by the transmitter/receiver 52. In this case, the file update unit 54 displays the file C1 on a monitor of the terminal 5-2.

Thus, in a case where terminals 5 existing in the same place hold the same file, even if users of the terminals 5 do not orally confirm the sharing of the file, the information processing system 9 may cause the terminals 5 to share the file. The information processing system 9 may cause an appropriate file to be shared without any cumbersome task. As a result, the information processing system 9 may avoid the loss of an opportunity for detailed discussion at a meeting.

As illustrated in FIG. 4B, the terminal 5-1 of the user A and a terminal 5-3 of a user C exist in the same place indicated by positional information eee. The example illustrated in FIG. 4B is described focusing on the file C1.

In the terminal 5-1, the terminal information generator 53 generates terminal information including information of the file A1 held in the terminal 5-1, the positional information eee of the terminal 5-1, the terminal ID of the terminal 5-1, and the user ID of the user A, and transmits the generated terminal information to the place server 3 via the transmitter/receiver 52.

In the terminal 5-3, the terminal information generator 53 generates terminal information including the information of the file C1 held in the terminal 5-3, the positional information eee of the terminal 5-3, a terminal ID of the terminal 5-3, and a user ID of the user C, and transmits the generated terminal information to the place server 3 via the transmitter/receiver 52.

In the place server 3, the token generator 32 generates a place server token from the terminal IDs included in the terminal information, the user IDs included in the terminal information, the positional information eee included in the terminal information, the server ID of the place server 3, access point information, and information indicating the start time of the generation of the token. Then, the transmitter/receiver 31 transmits information including the place server token, the terminal information of the terminal 5-1, and the terminal information of the terminal 5-3 to the processing server 1.

In the processing server 1, the table update unit 12 references the terminal information of the terminal 5-1, which is received from the place server 3, and adds, to the data table 21, the terminal ID, the user ID, the positional information eee, and the file information A1 that are included in the terminal information of the terminal 5-1. In addition, the table update unit 12 references the terminal information of the terminal 5-3, which is received from the place server 3, and adds, to the data table 21, the terminal ID, the user ID, the positional information eee, and the file information C1 that are included in the terminal information of the terminal 5-3.

In addition, in the processing server 1, the sharing determination unit 13 references the data table 21. If all terminals 5 identified by the terminal ID 21b and existing in the same place hold the same file, the sharing determination unit 13 determines that the file is a target file to be shared. In this example, it is not the case in which all the terminals 5-1 and 5-3 existing in the same place indicated by the positional information eee hold the same file. The sharing determination unit 13 references the data table 21, and if 50% or more of terminals 5 identified by the terminal ID 21b and existing in the same place hold the same file, the sharing determination unit 13 determines that the file is a target file to be shared. In this example, the terminals 5-1 and 5-3 exist in the same place indicated by the positional information eee, the terminal 5-3 holds the file C1, but the terminal 5-1 does not hold the file C1. Since 50% or more of the terminals 5 existing in the same place indicated by the positional information eee holds the file C1, the sharing determination unit 13 determines that the file C1 is a target file to be shared. Then, the sharing unit 14 sets the terminal ID of the terminal 5-3 holding the file C1, in the owner terminal ID 22b of the file sharing information 22 for the positional information eee. The sharing unit 14 sets the terminal ID of the terminal 5-1 that does not hold the file C1 in the non-owner terminal ID 22c of the file sharing information 22 for the positional information eee. Then, the transmitter/receiver 11 transmits the file sharing information 22 to the place server 3.

In the place server 3, the application generator 34 references the file sharing information 41 (the file sharing information 22 received by the transmitter/receiver 31). If there is a terminal 5 that does not hold the target file to be shared, the application generator 34 executes the following process. Specifically, the application generator 34 generates, for the terminal 5 that does not hold the target file to be shared, an application including information of the target file to be shared and positional information. In addition, the application generator 34 generates, for a terminal 5 holding the target file to be shared, an application including information of the target file to be shared and the positional information. In this example, since there is the terminal 5-1 that does not hold the file C1 to be shared, the application generator 34 generates, for the terminal 5-1, an application including the information of the file C1 to be shared and the positional information eee. Specifically, the application generator 34 generates the application in order to acquire and share the file C1. Since there is the terminal 5-3 holding the file C1 to be shared, the application generator 34 generates, for the terminal 5-3, an application including the information of the file C1 to be shared and the positional information eee. Specifically, the application generator 34 generates the application in order to share the file C1. Then, the transmitter/receiver 31 transmits the generated applications to the terminals 5-1 and 5-3.

If the sharing permission inquiry flag 22d for the file C1 to be shared is set to "ON", the application generator 34 executes the following process. Specifically, the application generator 34 generates, for the terminal 5-3 holding the file C1 to be shared, an application including the information of the file C1 to be shared, the positional information eee, a message of inquiring whether or not the terminal 5-3 permits the sharing of the file C1 with another terminal 5. Specifically, the application generator 34 generates, for the terminal 5-3 holding the file C1 to be shared, the application in order to notify of the inquiry regarding whether or not the terminal 5-3 holding the file C1 permits the sharing of the file C1 with another terminal 5. Then, the transmitter/receiver 31 transmits the generated application to the terminal 5-3.

Since the terminal 5-1 exists in the place indicated by the positional information eee included in the application, the file update unit 54 of the terminal 5-1 acquires and shares the file C1 to be shared, upon executing the application received by the transmitter/receiver 52. In this case, the file update unit 54 downloads the file C1 to the terminal 5-1 from the terminal 5-3 via the place server 3 and displays the file C1 on the monitor of the terminal 5-1.

Since the terminal 5-3 exists in the place indicated by the positional information eee included in the application, the file update unit 54 of the terminal 5-3 shares the file C1 to be shared, which is held in the terminal 5-3, upon executing the application received by the transmitter/receiver 52. In this case, the file update unit 54 displays the file C1 on a monitor of the terminal 5-3.

Next, an exemplary process to be executed by a terminal 5 is described with reference to FIG. 5. FIG. 5 is a diagram illustrating the exemplary process to be executed by the terminal 5 according to the embodiment.

As illustrated in FIG. 5, the terminal 5 determines whether or not a path of radio communication between the terminal 5 and the place server 3 is established (in S11). If the terminal 5 determines that the path of radio communication between the terminal 5 and the place server 3 is not yet established (No in S11), the terminal 5 repeats the determination process until the path of radio communication between the terminal 5 and the place server 3 is established.

On the other hand, if the terminal 5 determines that the path of radio communication between the terminal 5 and the place server 3 is established (Yes in S11), the terminal 5 collects file information of a file held in the terminal 5 (in S12). The terminal 5 collects positional information (in S13). The terminal 5 generates a terminal token from terminal information including the file information, the positional information, a terminal ID, and a user ID (in S14).

Then, the terminal 5 transmits the terminal information and the terminal token to the place server 3 (in S15).

After that, the terminal 5 determines whether or not the terminal 5 has received an application from the place server 3 (in S16). If the terminal 5 determines that the terminal 5 has received no application (No in S16), the terminal 5 repeats the determination process until the terminal 5 receives the application.

On the other hand, if the terminal 5 determines that the terminal 5 has received an application (Yes in S16), the terminal 5 executes the application to share a file specified in the application (in S17). For example, if the terminal 5 exists in a place indicated by positional information included in the application and does not hold the target file to be shared, which is specified in the application, the terminal 5 downloads the target file to be shared via the place server 3 and displays the file on a monitor. If the terminal 5 exists in the place indicated by the positional information included in the application and holds the target file to be shared, which is specified in the application, the terminal 5 displays the target file to be shared on the monitor. Then, the terminal 5 updates the file information held in the terminal 5 (in S18).

Then, the terminal 5 updates history information of the application (in S19). If a file is added to and held in the terminal 5, the terminal 5 updates the terminal information having the file information including information of the added file and the terminal 5 transmits terminal update information including the updated terminal information to the place server 3 (in S20).

Then, the terminal 5 determines whether or not the path of radio communication between the terminal 5 and the place server 3 is cut (in S21). If the terminal 5 determines that the path of radio communication between the terminal 5 and the place server 3 is not yet cut (No in S21), the terminal 5 causes the process to proceed to S16.

On the other hand, if the terminal 5 determines that the path of radio communication between the terminal 5 and the place server 3 is cut (Yes in S21), the terminal 5 terminates the process.

Next, an exemplary process to be executed by the place server 3 is described with reference to FIG. 6. FIG. 6 is a diagram illustrating the exemplary process to be executed by the place server according to the embodiment.

As illustrated in FIG. 6, the place server 3 determines whether or not a path of radio communication between a terminal 5 and the place server 3 is established (in S31). For example, if the place server 3 receives an inquiry (probe request) regarding establishment of path from a terminal 5 and determines to give permission to the inquiry, the place server 3 transmits a response (probe response) to the inquiry to the terminal 5 and determines that the path of radio communication between the terminal 5 and the place server 3 is established. On the other hand, if the place server 3 determines not to give permission to the inquiry, the place server 3 determines that the path of radio communication between the terminal 5 and the place server 3 is not yet established.

If the place server 3 determines that the path of radio communication between the terminal 5 and the place server 3 is not yet established (No in S31), the place server 3 repeats the determination process until the path of radio communication between the terminal 5 and the place server 3 is established.

On the other hand, if the place server 3 determines that the path of radio communication between the terminal 5 and the place server 3 is established (Yes in S31), the place server 3 determines whether or not the place server 3 has received terminal information and a terminal token (in S32). If the place server 3 determines that the place server 3 has not received the terminal information and the terminal token (No in S32), the place server 3 repeats the determination process until the place server 3 receives the terminal information and the terminal token.

On the other hand, if the place server 3 determines that the place server 3 has received the terminal information and the terminal token (Yes in S32), the place server 3 generates a place server token from the terminal information (in S33). Then, the place server 3 transmits the terminal information, the terminal token, and the place server token to the processing server 1 (in S34).

After that, the place server 3 determines whether or not the place server 3 has received file sharing information 22 from the processing server 1 (in S35). If the place server 3 determines that the place server 3 has not received the file sharing information 22 (No in S35), the place server 3 repeats the determination process until the place server 3 receives the file sharing information 22.

On the other hand, if the place server 3 determines that the place server 3 has received the file sharing information 22 (Yes in S35), the place server 3 references the file sharing information 22 and generates an application for each of terminal IDs of terminals 5 (in S36). For example, the place server 3 references the file sharing information 22 and generates, for each of the terminal IDs, an application including information of a target file to be shared and positional information. Then, the place server 3 distributes the applications to the respective terminals (in S37).

The place server 3 determines whether or not the place server 3 has received terminal update information or a specific keyword (in S38). If the place server 3 determines that the place server 3 has received no terminal update information and no specific keyword (No in S38), the place server 3 causes the process to proceed to S40.

On the other hand, if the place server 3 determines that the place server 3 has received terminal update information or a specific keyword (Yes in S38), the place server 3 transmits the received information (terminal update information or specific keyword) to the processing server 1 (in S39). Then, the place server 3 causes the process to proceed to S40.

The place server 3 determines whether or not the path of radio communication between the terminal 5 and the place server 3 is cut (in S40). If the place server 3 determines that the path of radio communication between the terminal 5 and the place server 3 is not yet cut (No in S40), the place server 3 causes the process to proceed to S35 in order to receive next file sharing information.

On the other hand, if the place server 3 determines that the path of radio communication between the terminal 5 and the place server 3 is cut (Yes in S40), the place server 3 terminates the process.

Figure 7:
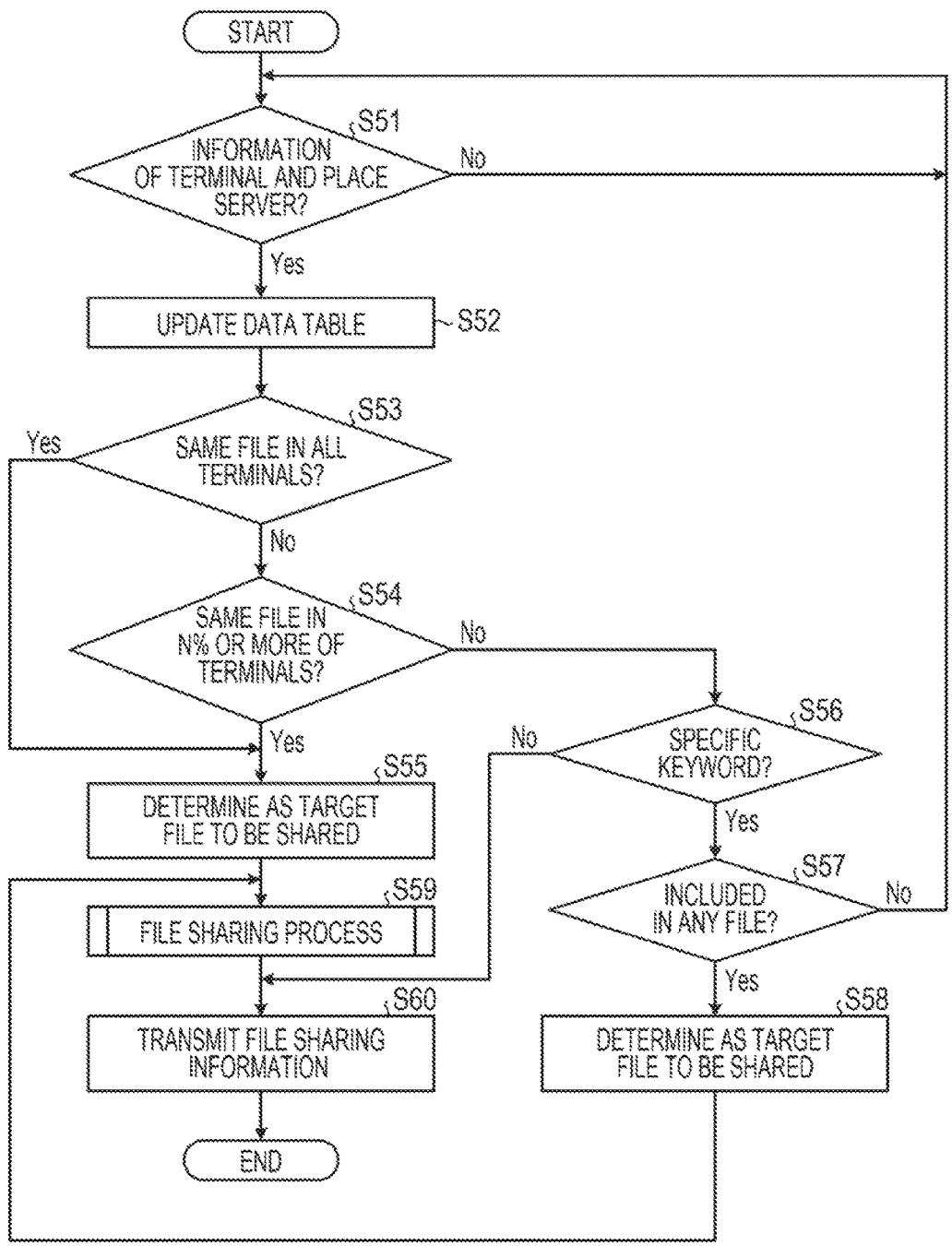
FIG. 7 is a flowchart illustrating an exemplary process executed by a processing server according to the embodiment.

Next, an exemplary process to be executed by the processing server 1 is described with reference to FIG. 7. FIG. 7 is a diagram illustrating the exemplary process to be executed by the processing server according to the embodiment.

As illustrated in FIG. 7, the processing server 1 determines whether or not the processing server 1 has received information of a terminal 5 and the place server 3 (in S51). If the processing server 1 determines that the processing server 1 has not received information of a terminal 5 and the place server 3 (No in S51), the processing server 1 repeats the determination process until the processing server 1 receives information of a terminal 5 and the place server 3.

On the other hand, if the processing server 1 determines that the processing server 1 has received information of a terminal 5 and the place server 3 (Yes in S51), the processing server 1 uses the received information to update the data table 21 (in S52). For example, the processing server 1 references the received terminal information of the terminal 5 and adds, to the data table 21, a new row including the terminal ID 21*b*, the user ID 21*c*, the positional information 21*d*, and the held file 21*e* respectively indicating the terminal ID, the user ID, the positional information, and the file information that are included in the terminal information. The processing server 1 references the received terminal update information of the terminal 5 and updates the held file 21*e* of a row including the terminal ID 21*b*, the user ID 21*c*, and the positional information 21*d* respectively indicating the terminal ID, the user ID, and the positional information that are included in the terminal update information, with the file information included in the terminal information.

The processing server 1 determines whether or not all terminals 5 coupled to the place server 3 and existing in a place indicated by the same positional information hold the same file (in S53). If the processing server 1 determines that all the coupled terminals 5 hold the same file (Yes in S53), the processing server 1 causes the process to proceed to S55.

On the other hand, if the processing server 1 determines that no file is held in common in all the coupled terminals 5 (No in S53), the processing server 1 determines whether or not N % or more of all the coupled terminals 5 hold the same file (in S54). If the processing server 1 determines that N % or more of all the coupled terminals 5 hold the same file (Yes in S54), the processing server 1 causes the process to proceed to S55.

On the other hand, if the processing server 1 determines that no file is held in common in N % or more of all the coupled terminals 5 (No in S54), the processing server 1 causes the process to proceed to S56.

The processing server 1 determines that the same file is a target file to be shared (in S55) and causes the process to proceed to S59.

The processing server 1 determines whether or not a specific keyword is included in the received information (in S56). If the processing server 1 determines that no specific keyword is included in the received information (No in S56), the processing server 1 causes the process to proceed to S60.

On the other hand, if the processing server 1 determines that a specific keyword is included in the received information (Yes in S56), the processing server 1 determines whether or not the specific keyword is included in any of files (in S57). If the processing server 1 determines that no file includes the specific keyword (No in S57), the processing server 1 causes the process to proceed to S51 in order to receive next information.

On the other hand, if the processing server 1 determines that the specific keyword is included in any of the files (Yes in S57), the processing server 1 determines that the file including the specific keyword is a target file to be shared (in S58) and causes the process to proceed to S59.

The processing server 1 executes the file sharing process on the target file to be shared (in S59). The file sharing process is described later in detail. Then, the processing server 1 causes the process to proceed to S60.

The processing server 1 transmits file sharing information 22 to the place server 3 (in S60). Then, the processing server 1 terminates the process.

Figure 8:
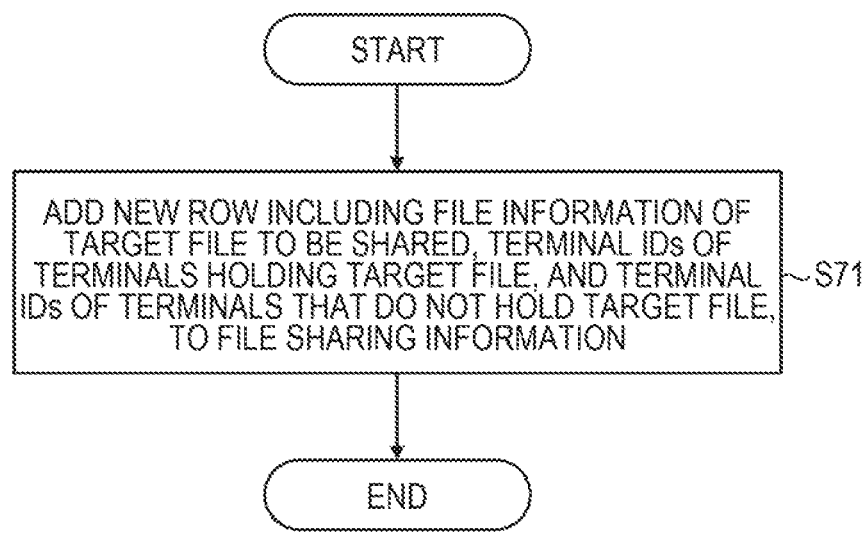
FIG. 8 is a flowchart illustrating an exemplary file sharing process according to the embodiment.

FIG. 8 is a diagram illustrating an exemplary file sharing process according to the embodiment. As illustrated in FIG. 8, the processing server 1 adds, to the file sharing information 22, a new row in which the to-be-shared file 22a indicates file information of the target file to be shared, the owner terminal ID 22b indicates terminal IDs of the terminals 5 holding the target file to be shared, and the non-owner terminal ID 22c indicates terminal IDs of the terminals 5 that do not hold the target file to be shared (in S71). The file sharing information 22 is generated for each piece of positional information, for example. Then, the processing server 1 terminates the file sharing process.

In the aforementioned embodiment, the processing server 1 uses the positional information indicating the position of a terminal 5, user information, and file information indicating files accessible from the terminal 5, that are included in terminal information held by respective terminals 5, to compare the file information of the respective terminals 5. Then, as a result of the comparison, the processing server 1 determines a file satisfying a predetermined requirement as a target file to be shared, and causes the terminals 5 to share the target file to be shared. With this configuration, the processing server 1 may cause the terminals to share an appropriate file without any cumbersome task.

In the aforementioned embodiment, if the requirement that the same file is accessible from all the terminals 5 is satisfied, the processing server 1 determines that the file is a target file to be shared and causes the terminals 5 to share the target file to be shared. With this configuration, the processing server 1 may cause the terminals 5 to share the target file to be shared, while users of the terminals 5 do not orally confirm the sharing of the target file. Thus, the processing server 1 may cause the terminals to share an appropriate file without any cumbersome task. As a result, the processing server 1 may avoid the loss of an opportunity for detailed discussion at a meeting, for example.

In the aforementioned embodiment, if the requirement that the ratio of the number of the terminals 5 accessible to a specific file to the number of all the terminals 5 in the same place is equal to or larger than a predetermined ratio is satisfied, the processing server 1 determines that the specific file is a target file to be shared and causes terminals 5 that do not hold the specific file to download and share the specific file. With this configuration, the processing server 1 may cause the terminals to share the specific file without any cumbersome task.

In the aforementioned embodiment, if the requirement that a file including a specific keyword detected in a certain place is accessible from any of terminals 5 existing in the certain place is satisfied, the processing server 1 determines that the file is a target file to be shared and causes terminals 5 that do not hold the target file to download and share the target file. With this configuration, the processing server 1 may cause the terminals to share a specific file including a specific keyword (for example, a word frequently received from a user or the like) detected in a certain place without any cumbersome task.

In the aforementioned embodiment, before a target file to be shared is shared, the processing server 1 notifies, to a terminal 5 accessible to the target file to be shared, an inquiry regarding whether or not the terminal 5 permits the sharing of the target file. With this configuration, the processing server 1 notifies, to a terminal 5 holding a target file to be shared, an inquiry regarding whether or not the terminal 5 holding the target file permits the sharing of the target file, thereby achieving reliable file sharing.

The aforementioned embodiment describes the case where, if the ratio of the number of the terminal IDs 21b of the terminals 5 holding the same file to the number of all terminals IDs 21b read from the data table 21 is equal to or larger than a predetermined ratio, the sharing determination unit 13 of the processing server 1 determines that the file is a target file to be shared. Specifically, if the number of terminal IDs 21b of terminals 5 holding the same file among the read terminals IDs 21b is large, the sharing determination unit 13 determines that the file is a target file to be shared. The sharing determination unit 13, however, is not limited to this. If the ratio of the number of read terminal IDs 21b of terminals 5 holding the same file to the number of all the read terminals IDs 21b is lower than a predetermined ratio, the sharing determination unit 13 may determine that the file is a target file to be shared. Specifically, if the number of the terminal ID 21b of the terminals 5 holding the same file among the read terminal ID 21b is small, the sharing determination unit 13 may determine that the file is a target file to be shared.

The embodiment describes the case where, on the basis of the data table 21, if the ratio of the number of the terminal IDs 21b of the terminals 5 holding the same file to the number of all terminals IDs 21b read from the data table 21 is equal to or larger than a predetermined ratio, the sharing determination unit 13 of the processing server 1 determine that the file is a target file to be shared. The sharing determination unit 13, however, is not limited to this. The sharing determination unit 13 may use meta-information of various types as a criterion for determining whether or not a file is to be shared. Examples of the meta-information of the various types include the frequency at which the users of the terminals 5 meet each other, a time interval between dates and times of the current meeting and the previous meeting, and the like. As an example, if users of multiple terminals 5 participate in a meeting at the same time in a place indicated by the same positional information many times, the sharing determination unit 13 may determine that files held in the respective terminals 5 are target files to be shared. As another example, if a time interval between the dates and times of the current meeting and the previous meeting held by users of multiple terminals 5 is short, the sharing determination unit 13 may determine that files held in the multiple terminals 5 are target files to be shared.

The embodiment describes the case where the processing server 1 causes terminals 5 to share a file held in one of the terminals 5. The embodiment, however, is not limited to this. The processing server 1 may cause terminals 5 to share a file accessible from one of the terminals 5. Specifically, the processing server 1 may cause terminals 5 to share not only a file held in one of the terminals 5 but also a file accessible from one of the terminals 5 and existing in a cloud computing environment, for example.

The embodiment describes the case where the information processing system 9 includes the processing server 1 and the place server 3. The information processing system 9, however, is not limited to this. For example, the processing server 1 may execute the process of the place server 3. Alternatively, the place server 3 may execute the process of the processing server 1. If the processing server 1 executes the process of the place server 3, the processing server 1 may execute a place-based service on terminals 5 existing in each of places, in addition to identifying a target file to be shared and executing the process of sharing the file among the terminals 5. In addition, if the place server 3 executes the process of the processing server 1, the place server 3 may identify a target file to be shared and execute the process of sharing the file among terminals 5 existing in each of places, in addition to executing a place-based service on the terminals 5.

In the aforementioned embodiment, the constituent elements of the devices illustrated in the drawings are not necessarily physically configured as illustrated in the drawings. Specifically, the specific modes of distribution and integration of the devices are not limited to those illustrated in the accompanying drawings, and the devices may be configured in arbitrary units by functionally or physically distributing and integrating all or a part of the devices on the basis of various loads, usage states, and the like. For example, in the processing server 1, the sharing determination unit 13 may distribute the determination process to determine whether or not a file is to be shared, based on a criterion for determining the sharing. In addition, in the place server 3, the transmitter/receiver 31 may include a transmission/reception unit that transmits and receives information and a distribution unit that distributes an application. In addition, in the processing server 1, the sharing determination unit 13 and the sharing unit 14 may be integrated into a single unit. In addition, the storage unit 20 may be an external device of the processing server 1 and coupled to the processing server 1 via a network.

Figure 9:
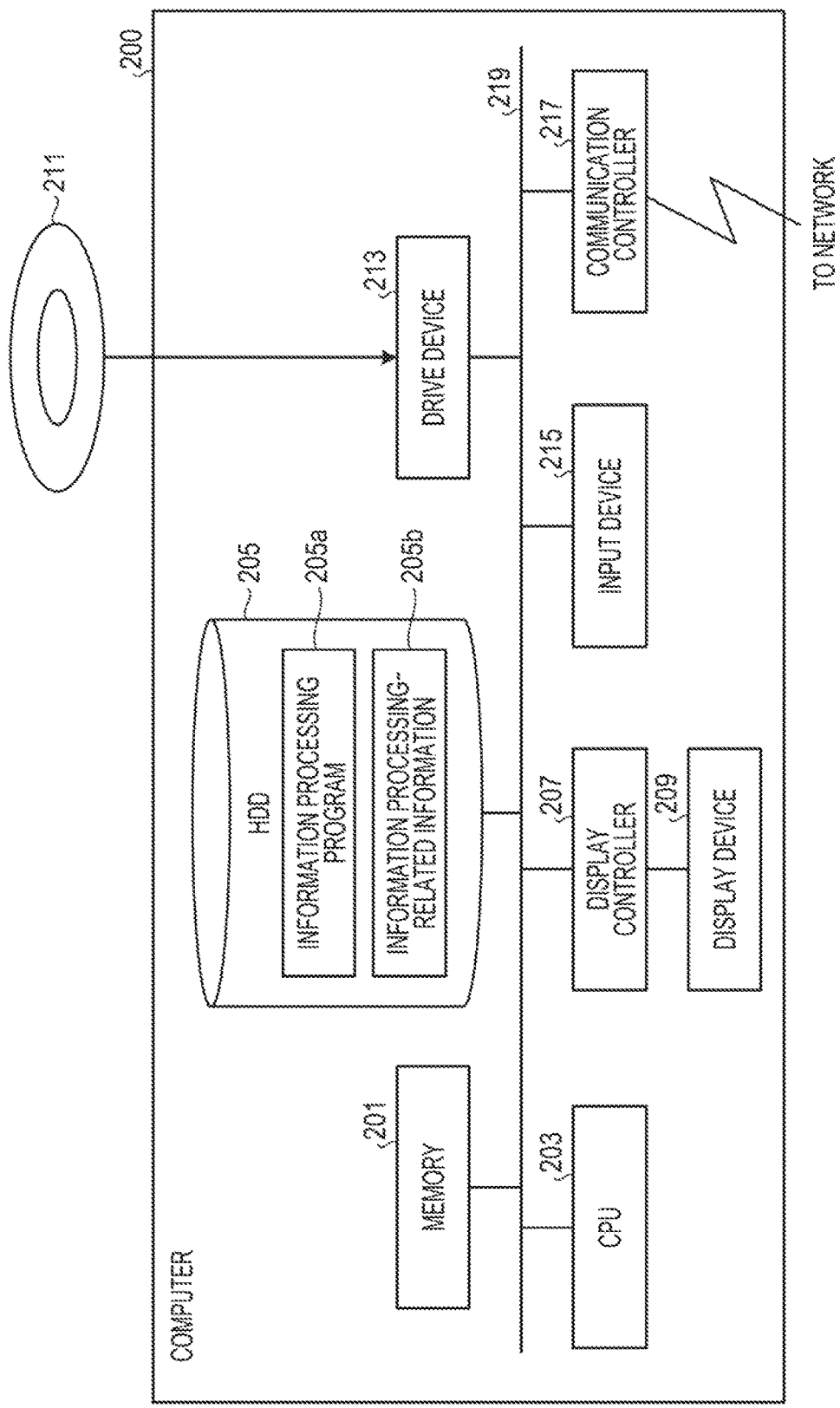
FIG. 9 is a diagram illustrating an example of a computer that executes an information processing program.

The various processes described in the embodiment may be achieved by causing a computer such as a personal computer or a workstation to execute a program prepared in advance. An example of a computer that executes an information processing program that achieves the same functions as those of the processing server 1 illustrated in FIG. 1 is described below. FIG. 9 is a diagram illustrating an example of a computer that executes the information processing program.

As illustrated in FIG. 9, a computer 200 includes a CPU 203 that executes various arithmetic processes, an input device 215 that receives data from a user, and a display controller 207 that controls a display device 209. The computer 200 also includes a drive device 213 that reads the program and the like from a storage medium, and a communication controller 217 that transmits and receives data to and from another computer via a network. The computer 200 also includes a hard disc drive (HDD) 205 and a memory 201 that temporarily stores therein various types of information. The memory 201, the CPU 203, the HDD 205, the display controller 207, the drive device 213, the input device 215, and the communication controller 217 are coupled to each other via a bus 219.

The drive device 213 is provided for a removable disk 211, for example. The HDD 205 stores the information processing program 205a and information processing-related information 205b.

The CPU 203 reads the information processing program 205a, loads the read information processing program 205a into the memory 201, and executes the information processing program 205a as processes. The processes correspond to the functional units of the processing server 1. The information processing-related information 205b corresponds to the data table 21, the file sharing information 22, and the like. For example, the removable disk 211 stores therein various types of information such as the information processing program 205a.

The information processing program 205a is not necessarily stored in the HDD 205 in an initial state. For example, the information processing program 205a may be stored in a "portable physical medium" that is inserted in the computer 200 and is a flexible disk (FD), a compact disc read-only memory (CD-ROM), a digital versatile disc (DVD), a magneto-optical disc, an integrated circuit (IC) card, or the like. The computer 200 may read the information processing program 205a from the portable physical medium and execute the information processing program 205a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device, comprising:
a memory; and
a processor coupled to the memory and the processor configured to:
receive terminal information of each of a plurality of terminals, the terminal information including position information indicating a position of a relevant terminal of the plurality of terminals and file information indicating files accessible from the relevant terminal;

compare the file information of the plurality of terminals on basis of the terminal information;

determine, on basis of a result of the comparison, a target file to be shared, the target file being a file satisfying a predetermined requirement;

execute a sharing process of causing the plurality of terminals to share the target file;

determine that a file identified by a file identifier is the target file upon determining that a ratio of a first number of first terminals of the plurality of terminals to a second number of the plurality of terminals is equal to or larger than a predetermined ratio, the first terminals being accessible to the file identified by the file identifier; and cause the plurality of terminals other than the first terminals to be accessible to the target file.

2. An information processing method, comprising:

receiving, by a computer, terminal information of each of a plurality of terminals, the terminal information including position information indicating a position of a relevant terminal of the plurality of terminals and file information indicating files accessible from the relevant terminal;

comparing the file information of the plurality of terminals on basis of the terminal information;

determining, on basis of a result of the comparison, a target file to be shared, the target file being a file satisfying a predetermined requirement;

executing a sharing process of causing the plurality of terminals to share the target file;

determining that a file identified by a file identifier is the target file upon determining that a ratio of a first number of first terminals of the plurality of terminals to a second number of the plurality of terminals is equal to or larger than a predetermined ratio, the first terminals being accessible to the file identified by the file identifier; and causing the plurality of terminals other than the first terminals to be accessible to the target file.

3. An information processing system, comprising:

a first information processing device including a first processor configured to:

receive terminal information of each of a plurality of terminals, the terminal information including position information indicating a position of a relevant terminal of the plurality of terminals and file information indicating files accessible from the relevant terminal;

compare the file information of the plurality of terminals on basis of the terminal information;

determine, on basis of a result of the comparison, a target file to be shared, the target file being a file satisfying a predetermined requirement;

execute a sharing process of causing the plurality of terminals to share the target file;

determine that a file identified by a file identifier is the target file upon determining that a ratio of a first number of first terminals of the plurality of terminals to a second number of the plurality of terminals is equal to or larger than a predetermined ratio, the first terminals being accessible to the file identified by the file identifier; and cause the plurality of terminals other than the first terminals to be accessible to the target file; and a second information processing device including a second processor configured to:

receive the terminal information from each of the plurality of terminals;

transmit the terminal information to the first information processing device;

generate an application for each of the plurality of terminals, the application including information indicating the target file and information indicating a place in which the plurality of terminals exist; and distribute the application to each of the plurality of terminals.

* * * * *